No. 888,055. PATENTED MAY 19, 1908.
C. A. BAKER.
WHEELBARROW CLIP.
APPLICATION FILED JUNE 3, 1907.

WITNESSES.

INVENTOR.
Charles A. Baker,
By Benedict, Morsell & Caldwell
ATTORNEYS

UNITED STATES PATENT OFFICE.

CHARLES A. BAKER, OF MILWAUKEE, WISCONSIN, ASSIGNOR TO STERLING WHEELBARROW COMPANY, OF MILWAUKEE, WISCONSIN, A CORPORATION OF WISCONSIN.

WHEELBARROW-CLIP.

No. 888,055.   Specification of Letters Patent.   Patented May 19, 1908.

Application filed June 3, 1907.   Serial No. 376,927.

To all whom it may concern:

Be it known that I, CHARLES A. BAKER, residing in Milwaukee, in the county of Milwaukee and State of Wisconsin, have invented new and useful Improvements in Wheelbarrow-Clips, of which the following is a description, reference being had to the accompanying drawings, which are a part of this specification.
This invention has for its object to provide a wheelbarrow with a clip for fastening the leg member to the handle member without weakening the latter.

Heretofore wheelbarrows have usually been made with leg members secured to the handle members by means of bolts necessitating openings through the handle member which serve to weaken the same at points where considerable stress is received in use, the result being that the handle members were frequently broken at these points.

This invention comprises a clip for wheelbarrows which will tightly clamp upon the handle members by surrounding the same and thereby hold the leg members or other parts in place without weakening the handle members.

With the above and other objects in view the invention consists in the wheelbarrow clip herein claimed and all equivalents.

Figure 1:
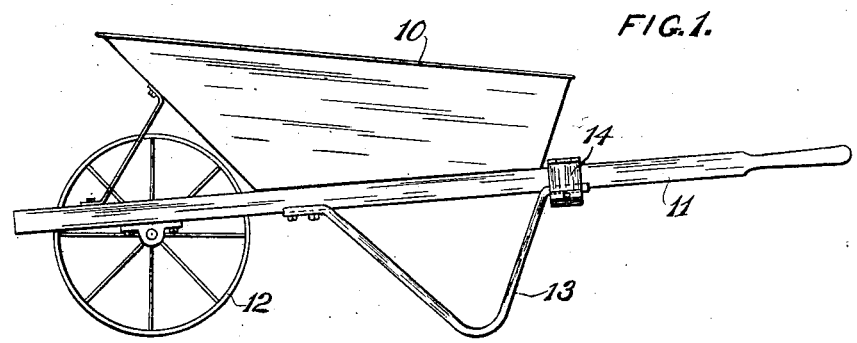
Figure 2:
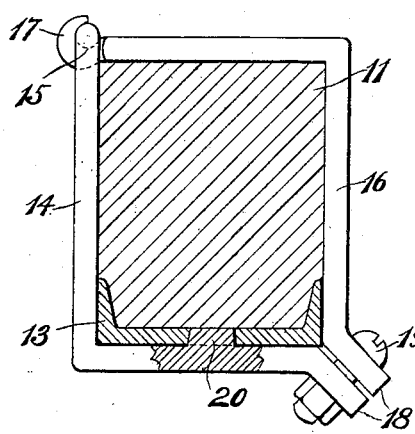
Figure 3:
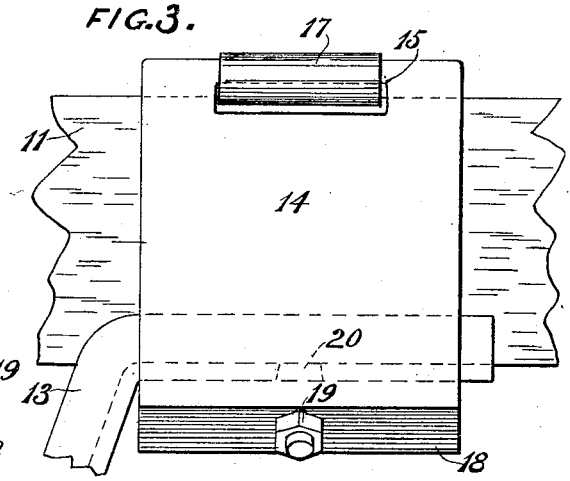
Figure 4:
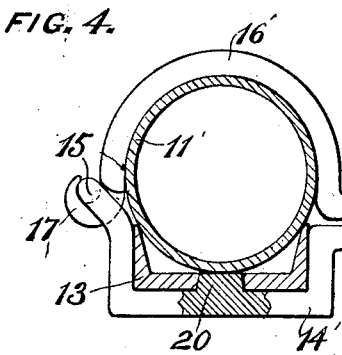

Referring to the accompanying drawings in which like characters of reference indicate the same parts in the several views; Figure 1 is a side elevation of a wheelbarrow provided with clips in accordance with this invention; Fig. 2 is a sectional elevation of the wheelbarrow clip; Fig. 3 is a side elevation thereof; Fig. 4 is a view similar to Fig. 2 of a modified form of this invention; and, Fig. 5 is a side elevation thereof.

In these drawings 10 represents a wheelbarrow body carried by the usual handle members 11 which are mounted on the wheel 12, the leg member 13 being secured to the handle members by means of the wheelbarrow clip of this invention. This wheelbarrow clip, as shown in Figs. 1, 2 and 3 for a wooden handle, comprises an angular member 14, preferably of cast metal, though it may be of strap sheet metal, and adapted to fit against the side of the handle member and beneath the channel iron leg member with a slotted eye portion 15 extending above the top of the handle member. A corresponding angular member 16 has a bent tongue or hook 17 engaging the eye 15 and extending over the top of the handle member and down the other side thereof. The free ends of the two members 14 and 16 are located at the diagonally opposite corner of the handle member from the hook and eye engagement thereof and extend in planes parallel to such diagonal to form ears 18 through which a clamping bolt 19 passes for tightly clamping the members together. The channel iron leg member 13 contains the opening which has heretofore been used for the passage of the bolt clamping said channel iron leg member to the handle member, but now the said opening is designed to receive a lug 20 projecting upwardly from the lower portion of angle member 14.

In applying the clip of this invention to secure the leg member in place on the handle member no boring of the handle member is required, but the clips are placed in the desired positions thereon with the angle iron leg members engaged by the lugs 20 entering the openings referred to and the clamping bolts 19 are placed through the ears and tightened therein to tightly clamp the parts together, the leg members being rigidly held in place on the handle members thereby.

Figure 5:
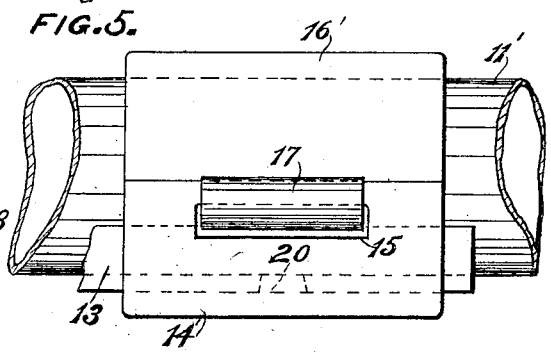

When tubular metal handle members are provided on the wheelbarrow, the clip of this invention is modified in construction as shown in Figs. 4 and 5, wherein the channel iron leg member 13 embraces the under part of the tubular handle member 11' and the upper member 16' is curved to fit the tubular handle member 11' and the lower member 14' is of a U-shape to receive the channel iron leg member 13, the hinge connection therebetween being located on one side of the handle member and the clamping ears 18 being located on the other side thereof. The clamping bolt 19 is provided as before to clamp the parts together and the lug 20 is also provided for engaging the opening of the leg member.

Besides securely fastening the leg member to the handle member without weakening the latter the clip of this invention is quickly and easily detachable for purposes of repair, and by means of the lug 20 fitting in the opening of the channel iron leg member there is no possibility of its slipping out of place.

What I claim as my invention is;

1. A wheelbarrow clip, comprising a pair of members hinged together and surrounding the handle member and the leg member of the wheelbarrow, ears projecting from said clip members opposite the hinge connection, and a clamping bolt connecting the ears for clamping the members tightly in place.

2. A wheelbarrow clip, comprising a pair of members hinged together and surrounding the handle member and the leg member of the wheelbarrow, a lug on one of the clip members entering an opening in the leg member, ears on the clip members opposite the hinge connection thereof, and a clamping bolt connecting the ears for tightly clamping the clip in place.

3. A wheelbarrow clip, comprising a pair of clip members surrounding the handle member and the leg member of the wheelbarrow, a hook formed on the end of one member and engaging an eye formed in the end of the other member, ears on the other ends of the clip members opposite the hook and eye connection thereof, and a clamping bolt passing through the ears for clamping the clip in place.

4. A wheelbarrow clip, comprising a pair of angular members surrounding the handle member and the leg member of the wheelbarrow, a hinge connection between the clip members at one end thereof located at an edge of the handle member, ears at the other end of the clip members at the diagonally opposite edge of the handle member, and a clamping bolt passing through the ears for clamping the clip in place.

In testimony whereof, I affix my signature, in presence of two witnesses.

CHARLES A. BAKER.

Witnesses:
A. L. MORSELL,
ALMA A. KLUG.